L. AND H. FARBER.
NUT BOWL.
APPLICATION FILED JUNE 25, 1920.
1,392,134.
Patented Sept. 27, 1921.
Fig.1.
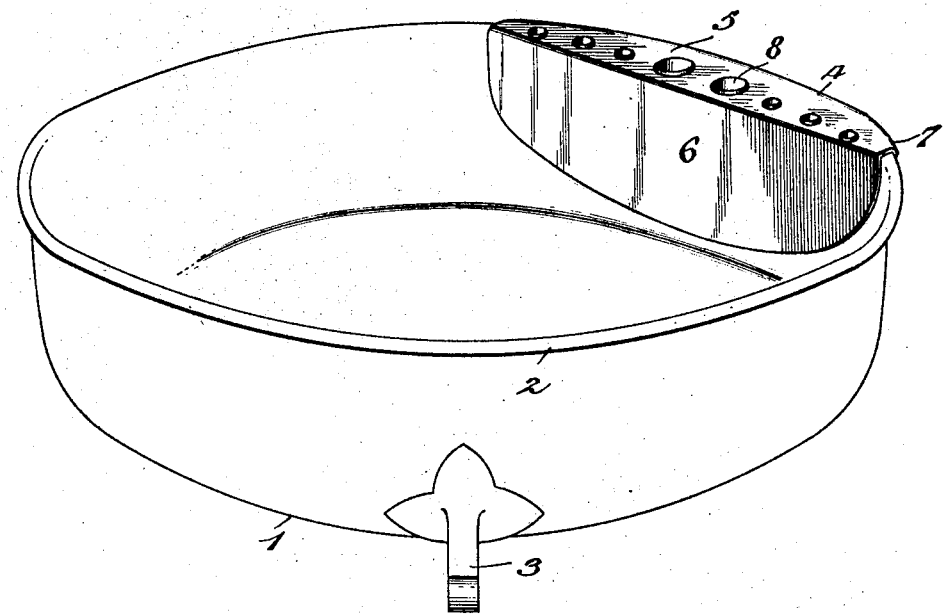
Fig.2.
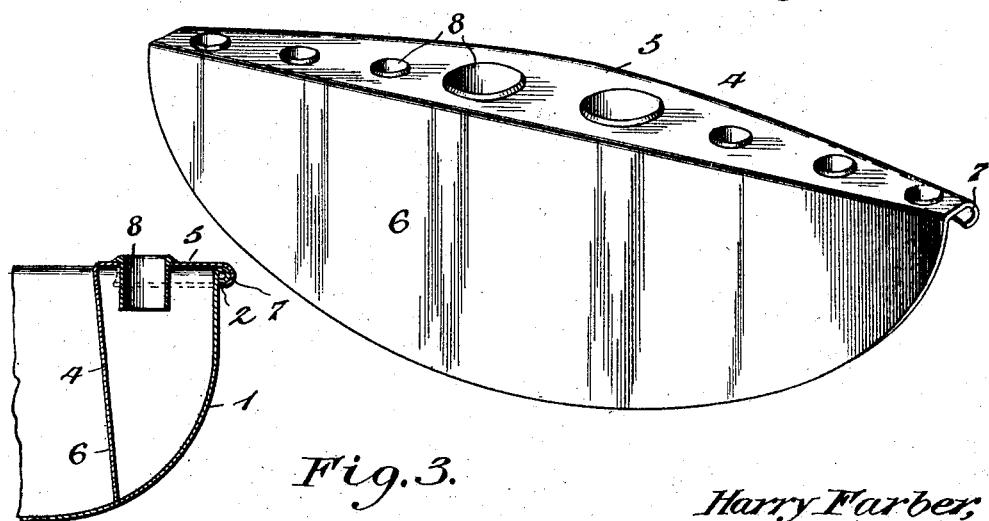
Fig.3.
Harry Farber,
Louis Farber.
INVENTOR
BY Victor J. Evans
ATTORNEY
WITNESS

UNITED STATES PATENT OFFICE.

LOUIS FARBER AND HARRY FARBER, OF NEW YORK, N. Y.

NUT-BOWL.

1,392,134.  Specification of Letters Patent.  Patented Sept. 27, 1921.

Application filed June 25, 1920. Serial No. 391,706.

*To all whom it may concern:*

Be it known that we, LOUIS FARBER and HARRY FARBER, citizens of the United States, residing at New York city, in the county of New York and State of New York, have invented new and useful Improvements in Nut-Bowls, of which the following is a specification.

This invention relates to improved means for producing a nut bowl as an article of manufacture.

The principal object is to provide a nut bowl with a self-retaining holder for nut picks and the nut cracker, which holder may be adjusted circumferentially of said bowl.

With these and incidental objects in view, the invention consists in certain novel construction and arrangement of parts herein set forth and claimed, and one embodiment of which is shown in the accompanying drawing comprising one sheet, in which:—

Figure 1 is a perspective view of our improved nut bowl.

Fig. 2 is a perspective view of the improved holder detached from the body of the device.

Fig. 3 is a vertical sectional view taken through the holder and bowl.

Like characters of reference refer to like parts in all views.

This invention contemplates the providing of a nut bowl with a rolled or beaded rim onto which is adapted to be sprung a member having a curled edge to grasp said bead and provided with eyelets or implement holders for the reception of nut picks and the handles of a nut cracker.

Referring more particularly to the drawings, 1 represents a nut bowl shell provided with a beaded rim 2, and if desired, with legs or standards 3.

The holder member 4 is produced by bending a piece of metal so as to form a top side 5 and a depending side 6, the two portions 5 and 6 being disposed at an angle less than 90 degrees, with relation to each other. The face 6 is curved so as to conform to the contour of the inside of the bowl and thereby seat itself snugly thereagainst. The face 5 is provided with a segmental margin which is rolled or curved at 7 so as to grasp the bead 2. Eyelets or tubes 8 are inserted in apertures in the face 5 and are headed at the upper end, these tubes forming receptacles for holding the nut picks and the handles of the nut cracker in upright position.

When the member 4 is sprung into place the curled portion 7 grasps the bead 2, and the acute angle between the faces 5 and 6 causes these faces to set up a binding action against the body of the bowl, which securely seats member 4 thereon. The member 4 may be moved along the bead 2 to various circumferential positions. If desired, a number of members 4 may be mounted on one bowl.

While there has been described a preferred form of embodiment of the invention, it is obvious that many changes may be made without in any way departing from the spirit of the invention; and the invention is therefore not limited to the exact details herein described nor to anything less than the whole of the invention limited only by the appended claim.

What we claim as new and desire to secure by Letters Patent is:—

A device of the class described comprising an instrument receiving portion having a curvilinear edge rolled to grasp the beaded edge of a curved dish and an apron portion bent at an acute angle and having a curvilinear lower edge to be seated against the curved inner surface of said dish so as to set up a binding action against removal of the device from the dish.

In testimony whereof we have affixed our signatures.

LOUIS FARBER.
HARRY FARBER.